(12) United States Patent
North et al.

(10) Patent No.: US 11,570,943 B2
(45) Date of Patent: Feb. 7, 2023

(54) METHOD FOR ADJUSTING THE HEIGHT OF A WEAR TOOL AND CORRESPONDING AGRICULTURAL MACHINE

(71) Applicant: KUHN S.A., Saverne (FR)

(72) Inventors: Julien North, Wintzenheim-Kochersberg (FR); Sylvain Citerne, Saverne (FR); Philippe Potier, Zittersheim (FR)

(73) Assignee: KUHN S.A., Saverne (FR)

( * ) Notice: Subject to any disclaimer, the term of this patent is extended or adjusted under 35 U.S.C. 154(b) by 615 days.

(21) Appl. No.: 16/604,414

(22) PCT Filed: Apr. 11, 2018

(86) PCT No.: PCT/FR2018/050904
§ 371 (c)(1),
(2) Date: Oct. 10, 2019

(87) PCT Pub. No.: WO2018/189480
PCT Pub. Date: Oct. 18, 2018

(65) Prior Publication Data
US 2020/0068776 A1 Mar. 5, 2020

(30) Foreign Application Priority Data
Apr. 12, 2017 (FR) .................................... 17 53200

(51) Int. Cl.
*A01B 63/111* (2006.01)
*G01B 21/22* (2006.01)
(Continued)

(52) U.S. Cl.
CPC .......... *A01B 63/1112* (2013.01); *G01B 21/22* (2013.01); *G01S 15/08* (2013.01); *G01S 17/08* (2013.01); *G01S 17/88* (2013.01)

(58) Field of Classification Search
CPC ..... A01B 63/1112; G01B 21/22; G01S 15/08; G01S 17/08; G01S 17/88
See application file for complete search history.

(56) References Cited

U.S. PATENT DOCUMENTS

2016/0157413 A1 6/2016 Kowalchuk et al.
2020/0149923 A1* 5/2020 Sauder .................. A01C 7/203

FOREIGN PATENT DOCUMENTS

DE 10 2011 005 317 A1 9/2012
EP 0 763 315 A1 3/1997
(Continued)

OTHER PUBLICATIONS

International Search Report dated Jul. 2, 2018 in PCT/FR2018/050904 filed on Apr. 11, 2018.

*Primary Examiner* — Luke D Ratcliffe
(74) *Attorney, Agent, or Firm* — Oblon, McClelland, Maier & Neustadt, L.L.P.

(57) ABSTRACT

A method for the vertical calibration of an agricultural machine wear tool is provided. The method includes: placing the wear tool in contact with a reference area; measuring the value of a position variable linked to the positioning of the wear tool when it is in contact with the reference area; determining the theoretical vertical positioning component of the wear tool according to the value measured, based on a reference curve; and determining a matching curve between a vertical positioning component of the wear tool and the position variable, by shifting the reference curve by a value equal to the theoretical vertical component.

17 Claims, 5 Drawing Sheets

(51) Int. Cl.
*G01S 15/08* (2006.01)
*G01S 17/08* (2006.01)
*G01S 17/88* (2006.01)

(56) References Cited

FOREIGN PATENT DOCUMENTS

EP     0 776 598 A1    6/1997
EP     0776598 A1 *    6/1997

* cited by examiner

METHOD FOR ADJUSTING THE HEIGHT OF A WEAR TOOL AND CORRESPONDING AGRICULTURAL MACHINE

BACKGROUND OF THE INVENTION

Field of the Invention

The present invention relates to the general technical field of agricultural machinery and in particular soil-working and seeding machines including wear tools.

Description of the Related Art

In the example of a conventional rotary harrow hitched to a tractor, which height is manually adjusted to ensure the proper work depth of the harrow, the user must operate the machine over a short distance, for example around several metres, get out of the tractor, dig in the worked soil and measure the loosened depth of the land himself. To adjust the work depth, he must then manually adjust the upper stop of a reference element such as a compaction roller. This upper stop is for example determined by placing a rod into one of the holes in a plate with multiple slots. Moving the rod may require lifting the harrow, moving the rod to the desired slot, lowering the harrow and checking the work depth as described above. Where necessary, the user may have to repeat the operation until the desired adjustment is achieved.

On other machines, the adjustment may be hydraulic. A control system makes it possible to act on an adjustment system including an actuator. A gauge moves on a graduated scale according to the position of the actuator. The user must then check the work depth as in the case of a manual adjustment: operate the machine over a short distance and measure the work depth himself. This type of hydraulic adjustment does not enable the work depth to be accurately determined.

The user may avoid adjusting the height of the wear tools if the process is too complex or too approximate.

It is desirable to control the work depth of the soil to ensure optimal preparation of the seedbed according to the species being sown.

Working the soil at an excessive depth means displacing more material than necessary, which increases the energy consumption of the machine. In addition, depending on the type of soil (sandy, stony), the soil-working tools of agricultural machines can be affected by significant abrasion and/or impacts. As a result, the wear on the tools may be accelerated and the lifespan of the tools reduced.

This may directly affect the quality of the seeding or depositing, and the yield, particularly in the case of certain species sensitive to germination conditions or the quality of the seedbed.

BRIEF SUMMARY OF THE INVENTION

The purpose of the invention is to propose a simplified and improved method for calibrating the height of an agricultural machine wear tool. The invention also concerns computer software for implementing such a method, and an agricultural machine able to implement the method.

As such, the invention concerns a method for calibrating the height of an agricultural machine wear tool, the agricultural machine including the wear tool and the method including the following steps:

placement of the wear tool in contact with a reference area;

measurement of the value of a position variable linked to the positioning of the wear tool when the wear tool is in contact with the reference area;

determination of the theoretical vertical positioning component of the wear tool according to the value measured, based on a reference curve;

determination of a matching curve between a vertical positioning component of the wear tool and the position variable linked to the positioning of the wear tool, by moving the reference curve by a value equal to the theoretical vertical component previously determined.

The method according to the invention advantageously makes it possible to directly determine the vertical component of the wear tool, for example linked to the length of the blades in the case of a rotary harrow, and linked to a height until a reference point, which simplifies the calibration and limits the user's intervention, for example by enabling him to remain inside the tractor while the depth of the wear tool is calibrated. This also saves time and improves the calibration accuracy.

The invention also concerns computer software including instructions for implementing the steps of the aforementioned method for calibrating the height of an agricultural machine wear tool when the instructions are executed on the agricultural machine.

The invention also concerns an agricultural machine including a wear tool, a reference element and a control unit configured to implement the aforementioned calibration method.

BRIEF DESCRIPTION OF THE SEVERAL VIEWS OF THE DRAWINGS

Other features and advantages of the invention will become apparent from the non-exhaustive example embodiments of the invention below and the attached drawings, in which.

DETAILED DESCRIPTION OF THE INVENTION

Figure 1:
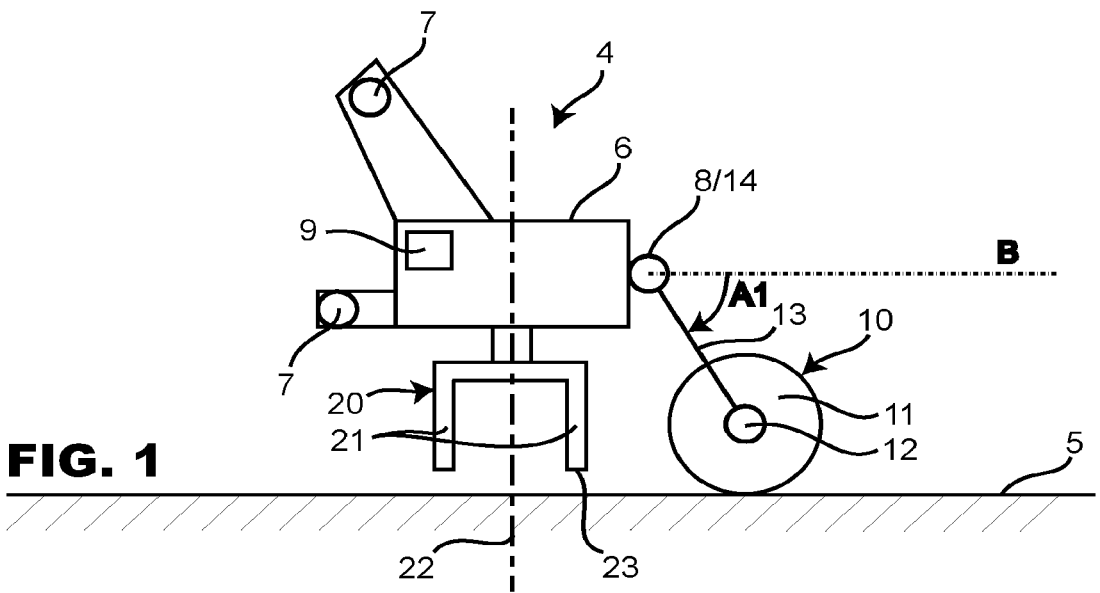
FIG. 1 is a simplified side view of a soil-working machine carrying a new soil-working tool in a raised position.

FIG. 1 illustrates an example of an agricultural soil-working machine 4 in a raised position, for example prior to a calibration method. The agricultural machine 4 includes a frame 6, a control unit 9, a reference element 10 and a wear tool 20, such as a soil-working tool. The reference element 10 is mounted in an articulated manner at the rear of the frame 6. The wear tool 20 extends underneath the frame 6, in this case vertically. The machine 4 is in this case, non-restrictively, of the rotary harrow type.

In FIG. 1, the reference element 10 is placed on a reference area 5 while the frame 6 is kept in the air by a vehicle such as a tractor (not shown) to which the machine 4 is hitched.

Figure 2:
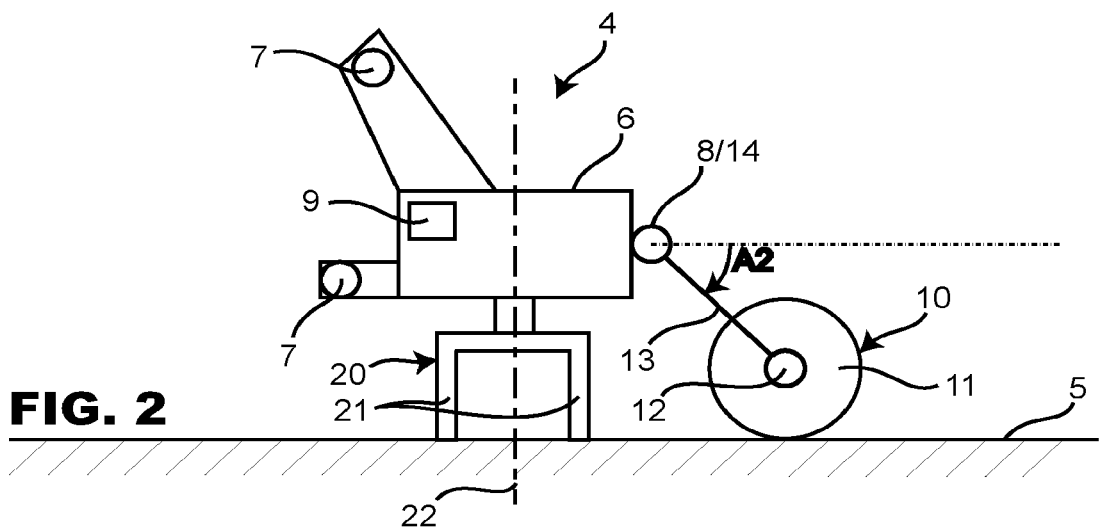
FIGS. 2 and 3 are side views of the machine in FIG. 1, respectively in a calibration position and a work position.

In FIG. 2, the machine 4 is illustrated in a calibration position, the wear tool 20 also being in contact with a reference area 5 which in this case is the same as that on which the reference element 10 is placed.

Figure 3:
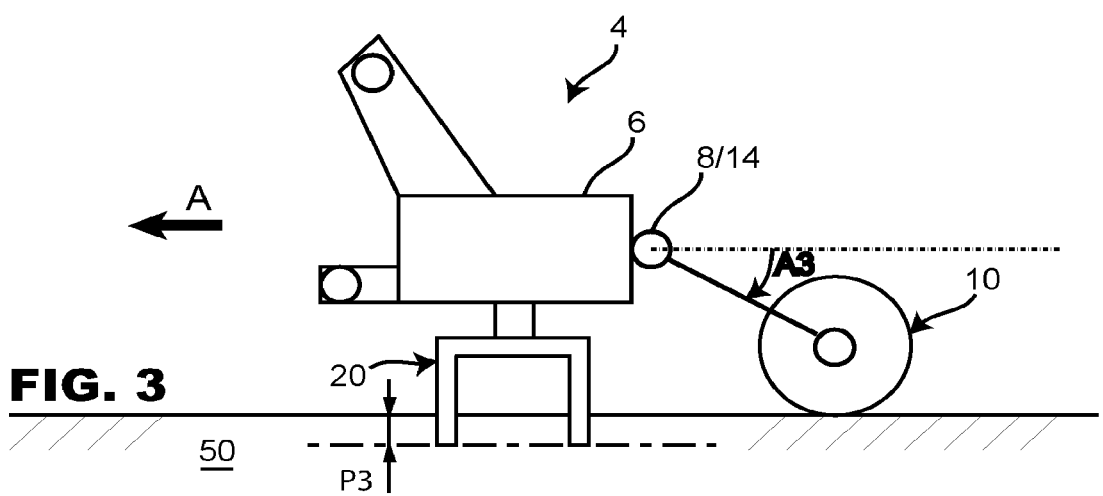

In FIG. 3, the machine 4 is shown in a work position. The wear tool 20 has partially penetrated the soil 50, which is for example the agricultural land to work.

In the example of FIGS. 1 and 2, the reference area 5 can be, non-restrictively, the aforementioned agricultural land 50 or a path, a concrete surface, etc. The gradient of the reference area 5 is preferably low, for example less than 10% and preferably less than 5%. The reference area 5 is for example a flat, firm and horizontal area. The frame 6 has hitching points 7 at the front and in this case two pivots 8 at the rear. The hitching points 7 are designed to be attached to the hitching device of the vehicle to which the machine 4 is hitched, for example a three-point hitch of a tractor.

In the embodiment example shown, a position sensor, which in this case is an angle sensor 14, is placed on one of the pivots 8, for example between the frame 6 and the reference element 10. The angle sensor 14 measures the angle A between a plane of reference B (see FIG. 1 preferably a horizontal plane such as the reference area 5 or a parallel to the reference area) and a movable support 13 of the reference element 10.

The control unit 9 in this case belongs to the machine 4, for example to the frame 6 as shown in FIG. 1. The control unit 9 is configured to perform at least the calculations of correspondence between variables.

The reference element 10 is in this case a soil-working roller. This roller can be, non-restrictively, a compaction or crumbling roller. The roller 10 as illustrated has a cylindrical body 11, two pivots 12 and two supports 13. The cylindrical body 11 is mounted at its ends to the supports 13 via the pivots 12. The supports 13 are themselves rotationally mounted on the frame 6 via the pivots 8. The reference element 10 can therefore move rotationally relative to the frame 6. The cylindrical body 11 is designed to be placed on the reference area 5 as in FIG. 1. The angle sensor 14 can detect a first angle A1 corresponding to the position of the reference element 10 when the machine 4 is in a raised position, neither the wear tool 20 nor the reference element 10 being in contact with the area 5, this angle A1 preferably remaining constant while the reference element 10 is at the lower stop, i.e. until the reference element 10 comes into contact with the area 5 as illustrated in FIG. 1.

The wear tool 20 is in this case a pair of teeth 21 or blades, arranged in fork position. The rotary harrow is for example fitted with a series of such forks, just one of which is shown and described in the interests of simplification. Each fork is mounted on a movable rotor that rotates around a vertical axis 22. The wear tool 20 is in this case used to prepare the seedbed by breaking up the clods of earth and crumbling the soil. The wear tool 20 is in this case rigidly fastened to the frame 6, i.e. so that an upward movement of the frame 6 will result in an upward movement of the wear tool 20 by the same value.

Figure 6:
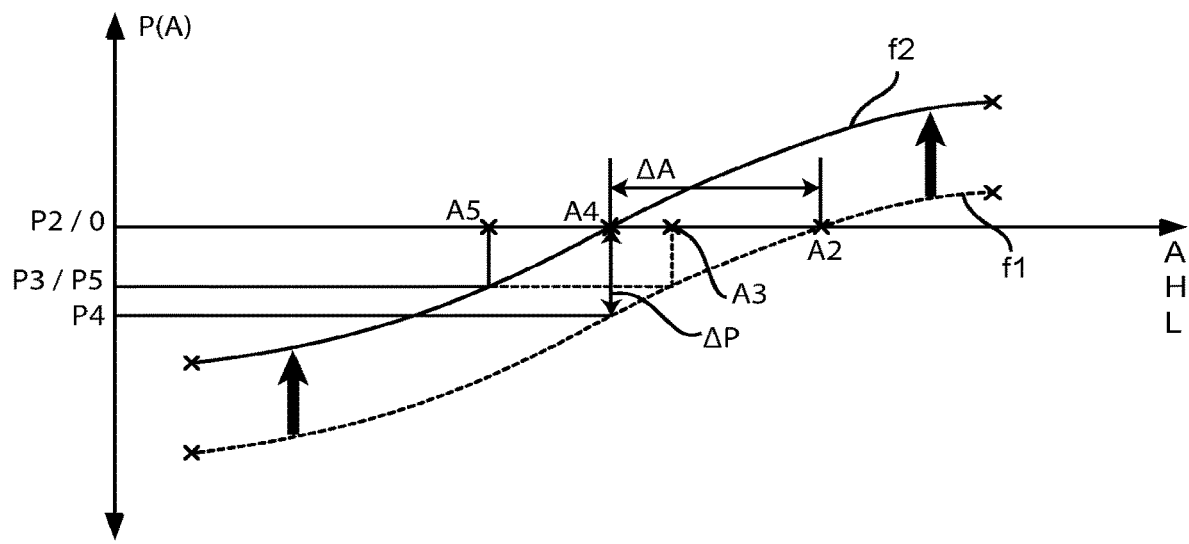
FIG. 6 shows two curves illustrating the vertical positioning of the soil-working tool according to a reference curve and a matching curve stemming from the reference curve.

FIG. 6 shows two curves f1 and f2. The curves f1 and f2 in FIG. 6 show the relationship between the vertical position P(A) of the wear tools 20 and 120 respectively and the angle A measured by the sensor 14. However, these curves f1 and f2 are for illustrative purposes only and should not be used as such for height calibration purposes. The vertical position P(A) is preferably that of a, or of the, lower point 23 of the concerned wear tool 20 or 120. The term "curve" is used in its broad sense and can include at least one list of values, interrupted or continuous, extrapolated or not. The curves are preferably between two lower and upper limits that correspond to physical limits of the machine, such as a lower stop and the highest stop of the reference element 10.

The curve f1 is an example of a reference curve saved in the memory of the control unit 9. The reference curve f1 can be a pre-saved curve provided by the manufacturer, for example giving the vertical position (i.e. height or depth) of the new tool 20 according to the position of the roller 10 measured by the sensor 14, or it can result from a previous calibration by shifting a reference curve when the tool 20 was in a previous worn state or a new state.

The curve f2 is an example of a matching curve obtained based on the curve f1 and calibration steps described below.

FIG. 2 shows the machine 4 placed on the reference area 5, in a calibration position. Compared with the raised position in FIG. 1, the machine 4 has been lowered and the lower end 23 of the wear tool 20, i.e. the teeth 21 in the example shown, are also in contact with the soil. The reference element 10 is therefore lifted relative to the frame 6 and the wear tool 20, and the sensor 14 measures an angle A2 smaller than the angle A1. With the new wear tool 20, the angle A2 is the theoretical value at which the curve f1 should intersect the x-axis (see FIG. 6).

FIG. 3 shows the machine 4 in a work position example in which it is further lowered relative to its position shown in FIG. 2. The wear tool 20 has then partially penetrated the soil 50 by a depth P3. The angle A3 measured by the sensor is in this case smaller than the angle A2 insofar as the frame 6 is lowered relative to the reference element 10, i.e. the body 11 has moved closer to the horizontal plane B.

Figure 4:
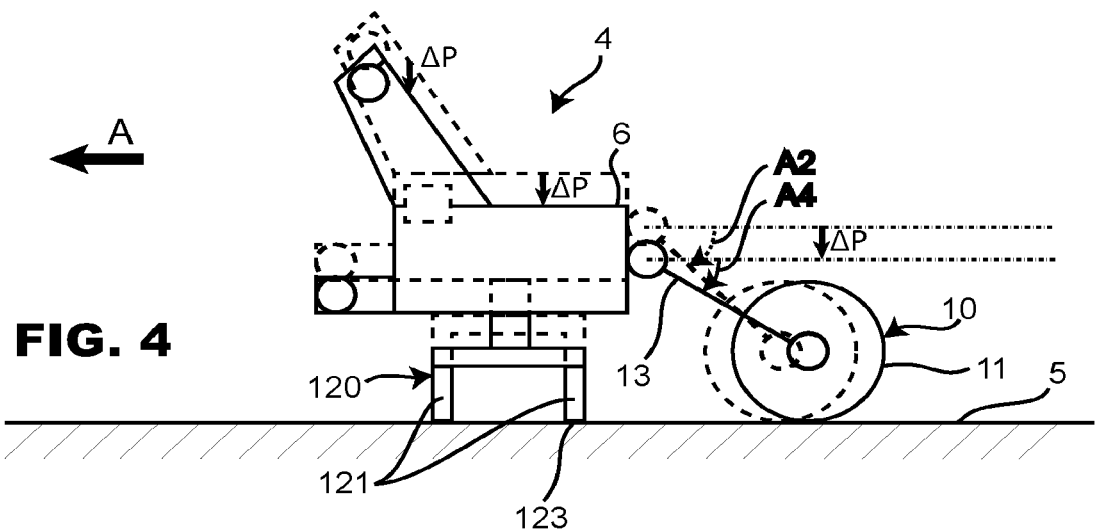
FIGS. 4 and 5 are views of the machine in FIG. 1 carrying a worn soil-working tool and shown in a calibration position and a work position.

By analogy to FIG. 2, FIG. 4 shows the machine 4 in a calibration position with a soil-working tool 120 of the same type as the tool 20, but in a worn state. The teeth 121 of the tool 120 are then shorter than the teeth 21 of the tool 20. This difference in length affects the height of each component of the frame 6 relative to the area 5, as well as the value of the angle between the support 13 and the horizontal: the angle A4 measured by the sensor 14 in the position in FIG. 4 is smaller than the angle A2. To make FIG. 4 easier to understand, the machine 4 in the position in FIG. 2 is shown in dotted lines.

Figure 5:
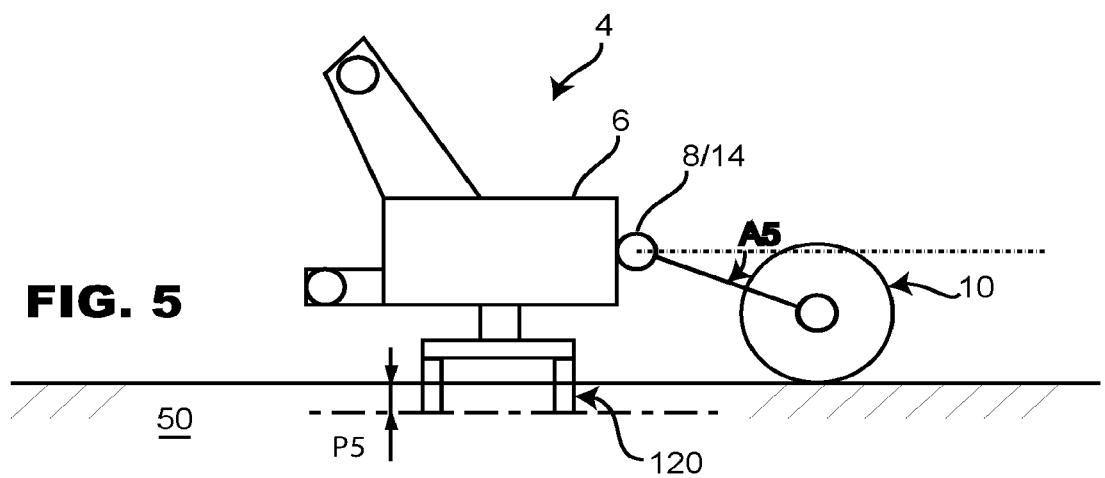

FIG. 5 shows the machine 4 carrying the soil-working tool 120, the machine 4 this time being in a work position. The wear tool 120 has then partially penetrated the soil 50 by a depth P5. In the example shown, the angle A5 measured by the position sensor 14 is smaller than the angle A4 by value, insofar as the frame 6 has been further lowered relative to the reference element 10. This work position is for example the result of an adjustment step that follows a calibration according to the calibration method described below.

Figure 7:
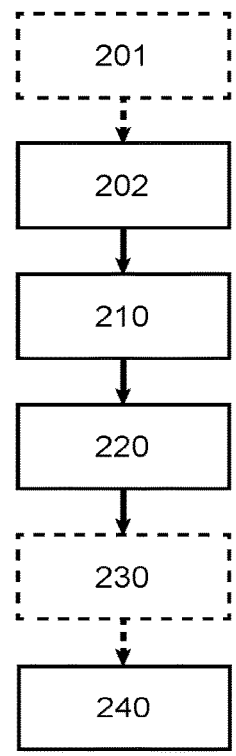
FIG. 7 is a diagram showing successive steps of the calibration method according to the invention based on the example of the machine in FIGS. 4 and 5.

The method for calibrating the vertical position P(A) of the wear tool 120 shown in FIGS. 4 and 5 can be conducted as follows:

lowering of the machine 4 until, firstly, the reference element 10 (step 201) and, secondly, a lower point 123 of the wear tool 120 (step 202) come into contact with the reference area 5 (FIGS. 4, 7);

measurement of the value A4 of the position parameter A of the reference element 10 in the position reached by the machine 4 that is in the calibration position (FIG. 4; step 210);

determination of the theoretical vertical component P4 (or theoretical height) of the lower point of the wear tool 120 according to the measured value A4 of the position parameter A, according to the reference curve f1 (step 220);

determination of the height difference ΔP between the theoretical height P4 and the reference area 5 (step 230);

determination of a matching curve f2 between the position of the reference element 10 and the position of the wear tool 120 by offset of ΔP from the reference curve f1 (step 240).

In the case of the machine 4 shown in FIGS. 1 to 5, including a rotary harrow and a soil-working roller, the reference element 10 is mounted in an articulated manner on the frame 6. The lowering of the reference element 10 and of the wear tool 120 (or of the tool 20, by analogy) then begins simultaneously and continues until the reference element 10 comes into contact with the area 5. The wear tool 120 then continues to lower with the frame 6 until the tool 120 comes into contact with the area 5. In other words, the reference element 10 is in this case placed on the area 5 before the wear tool 120.

Measuring a position parameter such as the angle A makes it possible to determine the offset ΔP between a theoretical height P2 or P4 of the wear tool 120 according to the reference curve f1 and the actual position of this tool 120 in its current wear state. As such, it is possible to define a matching curve f2 by offset of a value ΔP towards the upper end of the reference curve f1 (see FIG. 6). As the tool 120 rests on the reference area 5 during calibration, it is preferably assigned a height 0 at the reference area 5 and ΔP is equal in absolute value to the theoretical height, in this case P4, of the wear tool 120 on the curve f1 for the measured value of the position parameter A4. Step 230 is therefore optional.

Based on the matching curve f2 obtained, the height P(A) of the wear tool 120 can be precisely controlled, not only during calibration but also during work, for example based on the reference element 10.

As such, the following adjustment steps can be added to the calibration method:

entry of a desired work height Pn (i.e. a depth);

determination of the value An of the position variable of the reference element corresponding to the depth Pn according to the reference curve f2;

change of the height of the wear tool 120 (or of the frame 6) until the reference element 10 reaches the position An.

The position An of the reference element planned for the work is for example A3 or A5 (FIG. 3 or 5 respectively). The control unit 9 then knows that the wear tool 120 has reached the desired depth.

By analogy, this calibration method can be implemented with the new wear tool 20, for example to compensate for play due to the assembly or other wear tools (furrow opening disc, fixed blades, shares, straight discs, convex discs, corrugated discs, concave discs or discs of any shape, rotary cutter, etc.).

In a variant not shown, the wear tool 20 or 120 touches the reference area before the reference element 10. Once the wear tool 20 or 120 comes into contact with the reference area 5, the reference element 10 is lowered in a controlled manner, for example hydraulically.

The calibration method can also be implemented on the machine 4 carrying a new tool.

Figure 10:
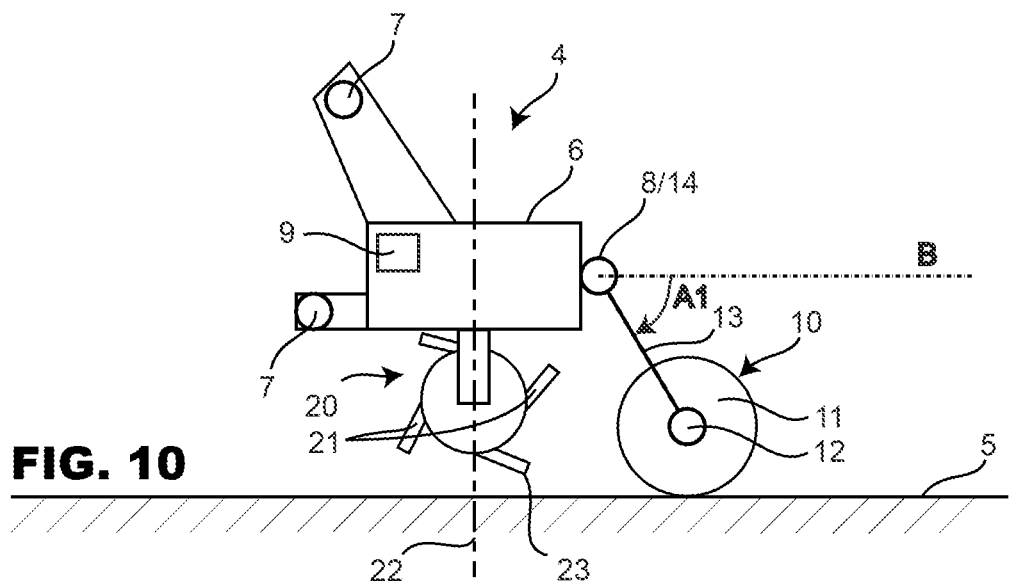
FIG. 10 is a simplified side view of a soil-working machine according to another embodiment.

In a variant shown in FIG. 10, the wear tool is a tool that rotates around an axis transverse to a vertical axis, i.e. horizontal or tilted at an angle less than 45 degrees of the horizontal for example. This can be for example a furrow opening disc, a disc of any other shape or structure, or a rotary cutter.

The agricultural machine 4 can include a display device not shown, to communicate the wear of the tool 20 or 120 to the user. The display device can for example be in the form of a series of LEDs (light emitting diodes) or a screen. A step of estimating and/or displaying the maximum depth and/or the remaining lifespan of the wear tool 20 can be included.

Alternatively to the angle sensor 14 or in addition to it, at least one position sensor of another type is included to measure any position variable liable to change during a relative movement between the frame 6 and the reference element 10. This can be a stretching sensor arranged between the frame 6 and the support 13. This stretching sensor then measures a length variation L between a point of the frame 6 and a point of the reference element such as a support 13.

In a variant not shown, the control unit 9 can be located in the vehicle to which the machine is hitched; for example it can be a control box or be located in a control box. In a further variant, the control unit 9 belongs to a separate machine that is combined with the agricultural machine 4 and from which the latter is controlled. More generally, the machine 4 and the control unit 9 belong to the same agricultural system. The control unit 9 can therefore either belong to the agricultural machine 4 or to an external element.

In a variant, the reference element 10 can be a support wheel for work or transport.

Figure 8:
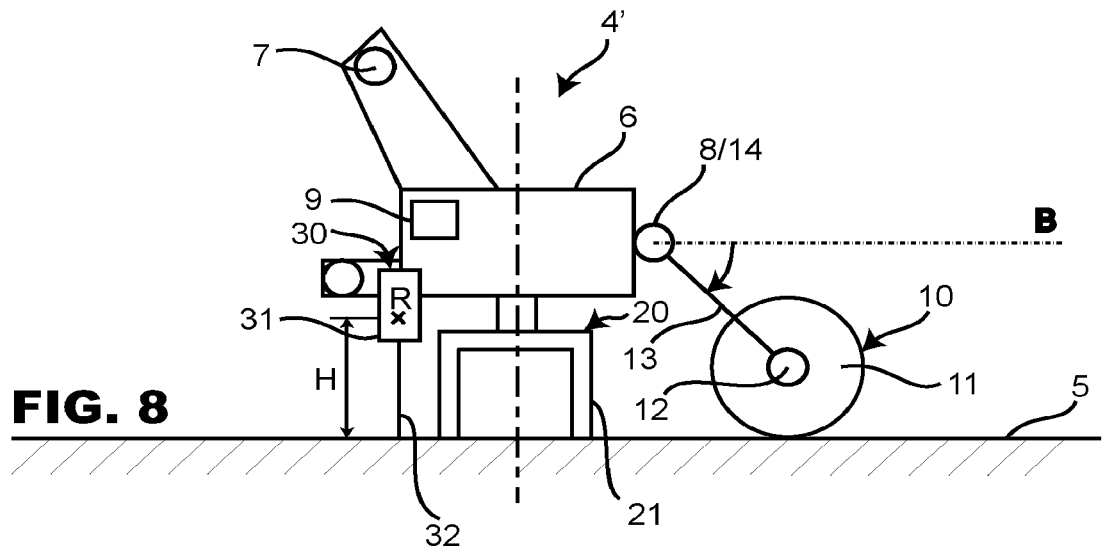
FIGS. 8 and 9 show two embodiments that are alternatives to the soil-working machine in FIGS. 1 to 5, in a calibration position.
Figure 9:
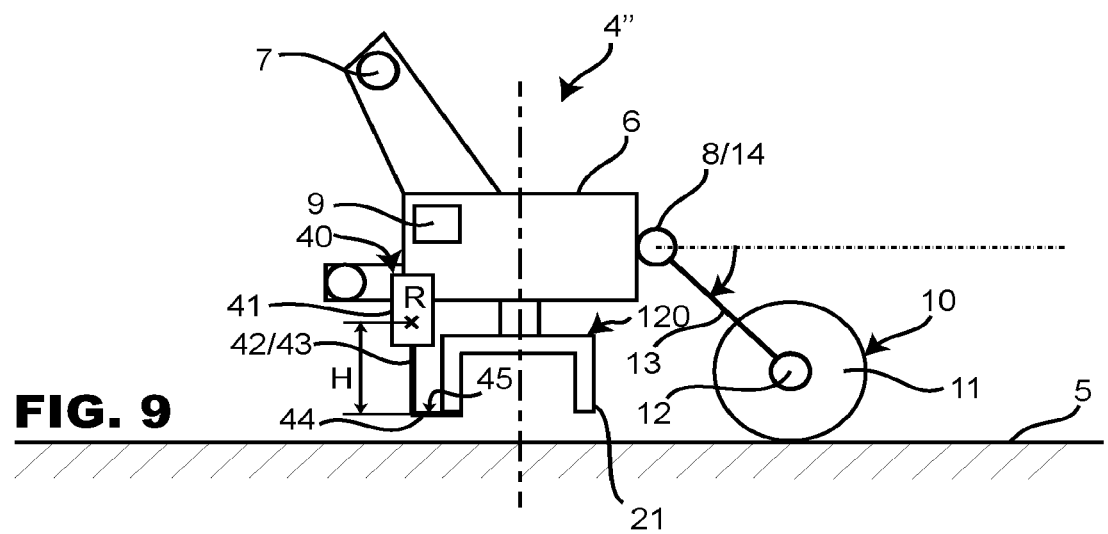

In FIGS. 8 and 9, two other agricultural machines 4' and 4" are shown, in which the general calibration method above can apply. The position variable measured is in this case a height H of a fixed reference point R relative to the frame 6. In these figures, the analogous elements have the same numerical references as previously.

In FIG. 8, the machine 4' includes a telemetering element 30, in this case a laser measuring element (or laser telemeter) represented by a box 31 and a beam 32. Alternatively, another type of telemetering element is conceivable, such as an ultrasonic measuring element (or ultrasonic telemeter, not shown).

In FIG. 8, the value H is measured using the vertical laser beam 32. The measurement method can include measuring the ray 32 return duration, the phase shift, etc.

In FIG. 9, the machine 4" includes a contact measuring element 40, or sensor. The sensor 40 includes for example a box 41 and an arm 42. The arm 42 has in this case a carrier part 43 and a contact part 44. When the machine is placed on horizontal ground, the parts 43 and 44 are in this case vertical and horizontal respectively. The carrier part 43 is mounted at one end in the box 41, which is movable at least in a translational manner along its own longitudinal axis and in a rotational manner around the latter. The contact part 44 extends transversely relative to a distal end of the part 43 opposite the first end. A reference area 45 is provided on the upper face of the part 44. The reference area 45 with which the wear tool comes into contact is therefore separate from the soil in this case.

The wear tool comes into contact with the reference area 45 (step 202) by lowering of the arm 42 relative to the frame 6, then rotating and raising the frame 6 such that the lower point 23 of the wear tool 120 is placed against the reference area 45. The contact part 44 can be sized to cover the entire space between the arm 43 and the axis 22 so as to guarantee contact between a lower point 23 of the wear tool 20 or 120.

In the examples in FIGS. 8 and 9, the height H for calibration is measured relative to a reference point R of the boxes 31 or 41. It is then useful, during work, to have a dynamic reference element such as the roller 10 to guarantee the work depth of the wear tool.

More generally, the calibration method can be limited to the following steps:
- placement of a lower point of the wear tool in contact with a reference area (step 202);
- automatic measurement of the value of a position variable linked to the positioning of the wear tool (step 210) when the lower point of the wear tool is in contact with the reference area;
- determination of the theoretical vertical positioning component of the wear tool according to the value measured, based on a reference curve f1 (step 220);
- determination of a matching curve f2 between a vertical positioning component of the wear tool and the position variable linked to the positioning of the wear tool, by shifting the reference curve f1 by a value ΔP equal to the theoretical vertical component previously determined (step 240).

One will understand that the machine 4, 4' or 4" is first placed in a calibration position in which the wear tool 20 or 120 is in contact with a reference area 5 or 45 that is, according to the embodiment examples, the same or otherwise as the reference area 5 on which the reference element 10 is placed.

Depending on whether the reference area 5 is loose or not, an additional adjustment parameter C can be added to compensate for the sinking of the reference element 10. For example, in the case of a compaction roller, the cylindrical body can be fitted with teeth evenly distributed across its entire surface, protruding by a radial distance C. On a loose surface, the teeth will sink in until the surface of the body comes into contact with the loose surface. The method must then include a step to add a factor C to correct the vertical positioning component P.

Based on the foregoing, one will understand that the term "position variable" may refer to:
- a lengthening or an angular displacement in the case of a measurement relative to a soil contact reference element such as a roller, wheels (support wheel for work or transport, drive wheel of the sun or skeleton wheel type), etc;
- a gross height measured between a reference point taken, for example, on the frame and the soil such as in the case of optical sensors;
- a gross height between a reference point taken, for example, on the frame and a position sensor.

The position variable studied is then directly (in the example of the optical sensors and the position sensor) or indirectly (in the example of the soil contact reference elements) linked to the positioning of the wear tool.

The invention claimed is:

1. A method for calibrating a height of an agricultural machine wear tool, an agricultural machine including the wear tool, the method comprising:
- placing the wear tool in a calibration position such that the wear tool is in contact with a reference area;
- measuring a value of a position variable when the wear tool is in the calibration position, the position variable corresponding to a vertical component of the wear tool;
- providing a predetermined reference curve providing a theoretical vertical component of the wear tool based on the position variable;
- determining the theoretical vertical component of the wear tool according to the measured value of the position variable and the reference curve; and
- determining a matching curve between the vertical component of the wear tool and the position variable based on the measured value of the position variable by shifting the reference curve by a value equal to the determined theoretical vertical component of the wear tool.

2. The method according to claim 1, wherein the agricultural machine includes a reference element designed to come into contact with the reference area, the reference area being the ground.

3. The method according to claim 2, further comprising placing the reference element on the reference area.

4. The method according to claim 2, wherein the reference element includes a soil-working roller, a drive wheel, a support wheel for work or a support wheel for transport.

5. The method according to claim 2, wherein at least one of a sensor of a position of the reference element relative to a frame of the agricultural machine is an angle sensor or the position variable is an angle.

6. The method according to claim 2, wherein at least one of a sensor of a position of the reference element relative to a frame of the agricultural machine is a stretching sensor or the position variable is a length which may change according to the position of the reference element.

7. The method according to claim 1, wherein the agricultural machine includes a telemetering element, the reference area being the ground.

8. The method according to claim 7, wherein the telemetering element is an optical sensor or an ultrasonic measuring element.

9. The method according to claim 1, wherein the agricultural machine includes a contact measuring element, the reference area belonging to the contact measuring element.

10. The method according to claim 7, wherein the position variable is a height, the method including measuring the height using the telemetering element.

11. The method according to claim 1, further comprising at least one of estimating a maximum depth achievable during work, displaying the maximum depth achievable during work, estimating a remaining lifespan of the wear tool, or displaying the remaining lifespan of the wear tool.

12. The method according to claim 1, wherein the wear tool is a rotary tool working around a vertical axis.

13. The method according to claim 1, wherein the wear tool is a rotary tool working around an axis transverse to a vertical axis.

14. The method according to claim 1, wherein the reference curve is a pre-saved curve of the height of the wear tool in a new state or in a previous worn state, according to the position variable.

15. A method to adjust the height of a wear tool comprising:
- a preliminary calibration step compliant with the calibration method according to claim 1;
- entry of a desired work depth;
- determining a desired position of the reference element corresponding to the desired work depth according to the matching curve; and
- changing the height of the wear tool until the desired position of the reference element is achieved.

16. A non-transitory computer readable medium including instructions for implementing the steps of the method for calibrating the height of an agricultural machine wear tool according to claim 1 when the instructions are executed by a processor.

17. An agricultural machine including a wear tool, a reference element and a control unit configured for the implementation of the calibration method according to claim 1.

\* \* \* \* \*